US012075870B2

(12) United States Patent
Terry et al.

(10) Patent No.: US 12,075,870 B2
(45) Date of Patent: Sep. 3, 2024

(54) PROTECTIVE GARMENT AND SEAM TAPE USED THEREWITH

(71) Applicant: Burlington Industries LLC, Greensboro, NC (US)

(72) Inventors: Nathaniel M. Terry, Greensboro, NC (US); Tamara R. Mease, Greensboro, NC (US); Nelson J. Bebo, III, Greensboro, NC (US); William J. Dilanni, Greensboro, NC (US)

(73) Assignee: Burlington Industries LLC, Charlotte, NC (US)

( * ) Notice: Subject to any disclaimer, the term of this patent is extended or adjusted under 35 U.S.C. 154(b) by 221 days.

(21) Appl. No.: 17/480,659

(22) Filed: Sep. 21, 2021

(65) Prior Publication Data

US 2022/0087348 A1     Mar. 24, 2022

Related U.S. Application Data

(60) Provisional application No. 63/184,878, filed on May 6, 2021, provisional application No. 63/081,535, filed on Sep. 22, 2020.

(51) Int. Cl.
*A41D 31/10* (2019.01)
*A41D 13/12* (2006.01)
(Continued)

(52) U.S. Cl.
CPC ......... *A41D 31/10* (2019.02); *A41D 13/1209* (2013.01); *B32B 5/024* (2013.01);
(Continued)

(58) Field of Classification Search
CPC ................ A41D 31/10; A41D 13/1209; A41D 2300/50; A41D 2500/20; A41D 27/245;
(Continued)

(56) References Cited

U.S. PATENT DOCUMENTS

| 3,953,566 | A |   | 4/1976 | Gore |            |
|-----------|---|---|--------|------|------------|
| 4,919,998 | A | * | 4/1990 | Goad | D06M 15/277 |
|           |   |   |        |      | 428/920    |

(Continued)

FOREIGN PATENT DOCUMENTS

| DE | 19917369    | 10/2000 |
| WO | WO 91/07278 | 5/1991  |

(Continued)

OTHER PUBLICATIONS

Gore-Tex Article; Wikipedia; uploaded Dec. 1, 2021 (Dec. 1, 2021); <https://en.wikipedia.org/wiki/Gore-Tex>.

(Continued)

*Primary Examiner* — Robert H Muromoto, Jr.
(74) *Attorney, Agent, or Firm* — Dority & Manning, P.A.

(57) ABSTRACT

A protective garment is disclosed that is reusable and can be relaundered over 70 times. The garment is made from a single layer barrier fabric. Any seams on the protective fabric are covered with a seam tape. The seam tape can include an adhesive layer, a cover layer, and an optional film layer positioned between the cover layer and the adhesive layer. The adhesive layer can be a crosslinkable polyester polymer.

20 Claims, 4 Drawing Sheets

(51) Int. Cl.
*B32B 5/02* (2006.01)
*B32B 7/06* (2019.01)
*B32B 27/12* (2006.01)
*B32B 27/32* (2006.01)
*C09J 7/21* (2018.01)

(52) U.S. Cl.
CPC ............... *B32B 7/06* (2013.01); *B32B 27/12* (2013.01); *B32B 27/322* (2013.01); *C09J 7/21* (2018.01); *A41D 2300/50* (2013.01); *A41D 2500/20* (2013.01); *B32B 2255/10* (2013.01); *B32B 2255/26* (2013.01); *B32B 2262/0276* (2013.01); *B32B 2307/732* (2013.01); *B32B 2405/00* (2013.01); *B32B 2437/00* (2013.01); *B32B 2535/00* (2013.01); *B32B 2571/00* (2013.01); *C09J 2400/263* (2013.01); *C09J 2427/001* (2013.01); *C09J 2467/00* (2013.01); *C09J 2467/006* (2013.01)

(58) Field of Classification Search
CPC ........... B32B 5/024; B32B 7/06; B32B 27/12; B32B 27/322; B32B 2255/10; B32B 2255/26; B32B 2262/0276; B32B 2307/732; B32B 2405/00; B32B 2437/00; B32B 2535/00; B32B 2571/00; B32B 27/08; B32B 2307/72; B32B 27/36; B32B 2307/54; B32B 2307/5825; B32B 2307/718; B32B 2307/7242; B32B 2307/7265; C09J 7/21; C09J 2400/263; C09J 2427/001; C09J 2467/00; C09J 2467/006; C09J 7/29; C09J 2203/358; C09J 2301/122; C09J 2301/304; C09J 2400/243; C09J 2427/006
See application file for complete search history.

(56) References Cited

U.S. PATENT DOCUMENTS

| | | | |
|---|---|---|---|
| 4,991,232 A * | 2/1991 | Taylor | A41D 13/1227 2/125 |
| 5,024,851 A * | 6/1991 | Goad | D06M 15/277 427/389.9 |
| 5,037,412 A | 8/1991 | Tanzer et al. | |
| 5,125,995 A | 6/1992 | D'Haese et al. | |
| 5,162,149 A | 11/1992 | Reaney | |
| 5,169,697 A | 12/1992 | Langley et al. | |
| 5,270,111 A | 12/1993 | D'Haese et al. | |
| 5,424,117 A * | 6/1995 | Heiman | D03D 15/44 38/52 |
| 5,445,874 A | 8/1995 | Shehata | |
| 5,599,610 A | 2/1997 | Levy | |
| 5,698,056 A | 12/1997 | Kamiyama et al. | |
| 5,698,307 A | 12/1997 | Levy | |
| 5,908,693 A | 6/1999 | Delgado et al. | |
| 5,948,707 A | 9/1999 | Crawley et al. | |
| 5,977,283 A * | 11/1999 | Rossitto | C09J 175/06 528/80 |
| 6,018,819 A | 2/2000 | King et al. | |
| 6,277,770 B1 * | 8/2001 | Smith, III | D03D 15/49 442/190 |
| 6,497,934 B1 | 12/2002 | Mahn et al. | |
| 6,680,100 B1 * | 1/2004 | Kocinec | C09J 7/35 428/102 |
| 6,774,183 B1 | 8/2004 | Goad et al. | |
| 7,191,497 B2 | 3/2007 | Butz | |
| 7,356,946 B2 | 4/2008 | Hannon et al. | |
| 7,510,752 B1 * | 3/2009 | Robertson | E04D 5/10 428/40.1 |
| 7,550,399 B2 * | 6/2009 | Kimbrell, Jr. | D03D 15/267 442/226 |
| 7,666,802 B2 | 2/2010 | Capwell | |
| 7,687,129 B2 | 3/2010 | Liggett | |
| 7,754,625 B2 | 7/2010 | Hendricks et al. | |
| 7,802,313 B2 * | 9/2010 | Czajka | A41D 13/1209 2/457 |
| 9,017,505 B2 | 4/2015 | Gallagher | |
| 9,731,469 B2 | 8/2017 | Gallagher | |
| 9,867,411 B2 | 1/2018 | Gallagher | |
| 9,986,742 B2 * | 6/2018 | Toreki | D06M 11/48 |
| 10,294,608 B2 | 5/2019 | Johnson | |
| 11,602,181 B2 * | 3/2023 | Palomo | A41D 13/1245 |
| 11,702,772 B2 * | 7/2023 | Aubrey | D03D 15/283 139/426 R |
| 2002/0100540 A1 | 8/2002 | Savitski et al. | |
| 2002/0157785 A1 | 10/2002 | Anderson et al. | |
| 2004/0129387 A1 * | 7/2004 | Ibrahim | E04D 15/06 156/577 |
| 2004/0188008 A1 * | 9/2004 | Robison | E04D 15/04 156/271 |
| 2004/0266297 A1 | 12/2004 | Schierenbeck et al. | |
| 2005/0064020 A1 | 3/2005 | Schuette et al. | |
| 2005/0235391 A1 * | 10/2005 | Jones | A41D 31/04 2/83 |
| 2006/0021118 A1 * | 2/2006 | Culler | A62B 17/006 2/457 |
| 2006/0157893 A1 | 7/2006 | Patel | |
| 2007/0028344 A1 * | 2/2007 | Czajka | A41D 13/1209 2/51 |
| 2007/0082165 A1 | 4/2007 | Barrett | |
| 2007/0264203 A1 | 11/2007 | Haggquist | |
| 2008/0108263 A1 * | 5/2008 | Conley | D04H 1/728 442/76 |
| 2008/0166514 A1 | 7/2008 | Liggett | |
| 2009/0222980 A1 | 9/2009 | Klug et al. | |
| 2009/0280284 A1 | 11/2009 | Pellegrini | |
| 2010/0215889 A1 | 8/2010 | Cienski | |
| 2010/0319712 A1 * | 12/2010 | Czajka | G09F 3/00 206/440 |
| 2011/0086208 A1 | 4/2011 | Nemphos, Jr. et al. | |
| 2011/0268909 A1 | 11/2011 | Deak et al. | |
| 2012/0282425 A1 | 11/2012 | Gallagher | |
| 2012/0295063 A1 * | 11/2012 | Howland | D06M 16/00 28/169 |
| 2014/0020151 A1 * | 1/2014 | Czajka | G09F 3/00 2/114 |
| 2014/0259278 A1 * | 9/2014 | Feldman | A41D 27/245 2/114 |
| 2014/0331375 A1 * | 11/2014 | Howland | A41B 1/08 2/2.5 |
| 2015/0000839 A1 * | 1/2015 | Czaplicki | C08L 71/00 156/330 |
| 2015/0224738 A1 | 8/2015 | Gallagher | |
| 2015/0267016 A1 * | 9/2015 | Humiston | B32B 5/026 442/268 |
| 2016/0046105 A1 | 2/2016 | Markowski et al. | |
| 2016/0374615 A1 * | 12/2016 | Tsukada | D06M 15/3566 600/382 |
| 2017/0022658 A1 * | 1/2017 | Fang | D06N 3/0034 |
| 2017/0042280 A1 * | 2/2017 | Bacino | A41B 11/005 |
| 2019/0343198 A1 * | 11/2019 | Palomo | A41D 27/00 |
| 2020/0297556 A1 * | 9/2020 | Png | A61F 13/49006 |
| 2021/0059046 A1 * | 2/2021 | Koshimizu | H05K 3/28 |
| 2021/0130652 A1 * | 5/2021 | Chou | H04N 13/254 |
| 2021/0401093 A1 * | 12/2021 | Newsome | A41D 27/10 |
| 2022/0087348 A1 * | 3/2022 | Terry | B32B 27/12 |
| 2022/0240603 A1 * | 8/2022 | Smith | A41D 13/02 |
| 2023/0183531 A1 * | 6/2023 | Summey | B32B 27/08 156/334 |

FOREIGN PATENT DOCUMENTS

| | | |
|---|---|---|
| WO | WO98/29000 A1 | 7/1998 |
| WO | WO2014/130940 A1 | 8/2014 |
| WO | WO2016/007878 A1 | 1/2016 |

(56) References Cited

OTHER PUBLICATIONS

International Search Report and The Written Opinion of the International Searching Authority, or the Declaration Corresponding to Application No. PCT/US21/51239 on Dec. 30, 2021.

* cited by examiner

PROTECTIVE GARMENT AND SEAM TAPE USED THEREWITH

RELATED APPLICATIONS BACKGROUND

The present application is based on, and claims priority to, U.S. Provisional Patent Application Ser. Nos. 63/081,535 filed Sep. 22, 2020 and 63/184,878 filed May 6, 2021, which are incorporated herein by reference.

BACKGROUND

Medical protective apparel, such as drapes and gowns, are designed to protect medical workers during the performance of their occupations. Most protective apparel are designed to cover at least the front torso and the arms of the wearer. Many of these protective garments also cover the back torso area. The protective apparel is designed to protect the wearer from coming into contact with all different types of fluids, such as blood, saliva, plasma, serums, other bodily fluids, and other liquids. Such protective apparel, for instance, should be designed to prevent fluids from penetrating or striking through the fabric used to make the apparel.

The protective apparel should also provide protection to the wearer from contact with bacteria and viruses. In fact, with the worldwide pandemic related to the Coronavirus, these types of protective garments are going to be needed over a much broader range of occupations. Currently, for instance, such garments are typically worn by healthcare workers in hospitals, nursing homes, out-patient facilities, medical and dental laboratories, and the like. With the recent escalation in virus transmission, however, these protective garments are needed in other environments and for various different occupations. For instance, such protective apparel may be needed in industrial settings, places of business, schools, and the like.

The level of protection provided by protective apparel can be in accordance with the standards established by the Association for the Advancement of Medical Instrumentation (AAMI). The AAMI, for instance, has promulgated different levels for barrier performance and has published guidelines for barrier classification. For example, the current AAMI classification ranges from Level 1 for the lowest barrier protection against the penetration of fluids to Level 4 which is the highest level of barrier protection.

In the past, most protective apparel worn by healthcare workers was made to be disposable after a single use. Such gowns and drapes, for instance, were made from multiple layers of nonwoven materials that contained fibers made from petroleum-based polymers. The use of disposable products, however, especially those made from petroleum-based polymers are contrary to many sustainability efforts. Consequently, recent attention has been directed towards reusable protective garments and apparel made from woven or knitted fabrics. Reusable garments are more environmentally friendly by reducing the amount of waste plastic that enters the solid waste stream. One reoccurring problem with producing reusable garments and apparel is the ability to maintain barrier protection along the seam after multiple laundry cycles. Consequently, in the past, products were made from multiple layers of fabric that had offset seams. For example, in the past, protective garments have been made in which the sleeves are made from multiple layers of material in which the inner layer of material creates a seam in one location while the outer layer of material creates a seam on the opposite side of the sleeve. In this manner, each seam is always protected by a layer of fabric. These garments, however, are somewhat expensive to make and require a somewhat complex process of producing the sleeves.

In view of the above, a need exists for protective apparel and garments that are reusable and have seams that not only provide barrier protection but also can remain effective after multiple laundry cycles.

SUMMARY

In general, the present disclosure is directed to protective garments that are reusable and can provide barrier protection against all different types of fluids and microorganisms, including bacteria and viruses. The present disclosure is also directed to a seam tape that is designed to cover seams on a reusable garment and provides the garment with barrier protection while also being capable of withstanding multiple laundry cycles. The seam tape can have a unique multi-layer structure that provides various advantages and benefits.

In one embodiment, for instance, the present disclosure is directed to a protective garment comprising a body portion having a front and optionally a back. The body portion is connected to a first sleeve and to a second and opposite sleeve. Each sleeve defines a hollow tubular portion for receiving a corresponding arm of a user. The body portion and sleeves are made from a woven or knitted fabric. The first sleeve defines a first seam that extends along the length of the hollow tubular portion of the first sleeve and the second sleeve defines a second seam that extends along the length of the hollow tubular portion of the second sleeve. In accordance with the present disclosure, the protective garment further includes a first seam tape covering the first seam and a second seam tape covering the second seam. Each seam tape comprises a fabric layer, an adhesive layer, and optionally a film layer positioned between the fabric layer and the adhesive layer. The adhesive layer is bonded to the sleeve along the corresponding seam. The adhesive layer comprises a thermoset polymer and wherein the garment is constructed to provide at least AAMI Level 1 protection, AAMI Level 2 protection, and/or AAMI Level 3 protection.

The protective garment of the present disclosure is reusable and can be laundered many times. For instance, the protective garment can maintain its Level 3 AAMI rating even after being laundered 60 or 75 laundry cycles. Of particular significance, the seams of the protective garment can maintain a Level 3 rating or greater even after 75 laundry cycles or after 100 laundry cycles. The fabric used to make the protective garment can be a woven fabric made from polyester yarns. The polyester yarns can comprise multifilament yarns. In one aspect, the woven fabric can contain greater than about 80 warp yarns per inch, such as greater than about 130 warp yarns per inch, and generally less than about 200 warp yarns per inch, such as less than about 180 warp yarns per inch. The woven fabric can contain greater than about 60 fill yarns per inch, such as greater than about 70 fill yarns per inch, and generally less than about 130 fill yarns per inch, such as less than about 110 fill yarns per inch. The basis weight of the fabric can be from about 1.8 osy to about 3.2 osy, such as from about 2.3 osy to about 2.8 osy. The fabric can also be calendered in order to improve the barrier properties of the fabric. In one aspect, the protective garment can be made from a single layer of the fabric except where the seam tape is located.

As described above, the seam tape includes a fabric layer, an optional film layer, and an adhesive layer. The adhesive layer can comprise a thermoset copolyester polymer. In one aspect, the adhesive layer can be crosslinked and can be pressed into the interstices of the woven fabric along each respective seam. For instance, the seam tape can be applied to the seam under heat and pressure. The adhesive layer can have a thickness of greater than about 2.5 mils, such as greater than about 2.8 mils, such as greater than about 3 mils. The film layer can be an expanded polytetrafluoroethylene film.

The present disclosure is also directed to a seam tape for use in protective garments. The seam tape includes a fabric layer, an adhesive layer, and an optional film layer positioned between the fabric layer and the adhesive layer. In accordance with the present disclosure, the adhesive layer can comprise a crosslinkable copolyester thermoset polymer. The adhesive layer can have a thickness of from about 2.5 mils to about 5 mils, such as from about 3 mils to about 4.5 mils, such as from about 3.6 mils to about 4.1 mils. The seam tape can have a width of from about 0.75 inches to about 2.5 inches, such as from about 0.9 inches to about 1.4 inches. The thermoset polymer of the adhesive layer can have a cure temperature of greater than about 350° F., such as greater than about 400° F., and generally less than about 500° F. In one aspect, the seam tape can further include a release layer, such as a silicone release layer that can be removed prior to application to a seam on a garment.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a protective garment that is particularly well suited to protecting the user from fluids and providing an impenetrable barrier to many liquids. For instance, when used in the medical industry, the protective garment can protect a user from blood, other body fluids, saline solutions, and other fluids from penetrating or striking through the fabric. In this regard, the protective garment can also provide protection against many microorganisms including pathogens, bacteria, or viruses. The protective garment is designed to be reusable and can undergo multiple laundry cycles and still retain its protective barrier properties. Of particular advantage, the protective garment can be designed as a single layer garment, made from a lightweight barrier fabric that may be treated with a durable water-resistant treatment. In accordance with the present disclosure, the protective garment further includes a seam tape that protects the seams of the garment and prevents the seams from permitting the flow of fluids. In fact, the seam tape of the present disclosure can be designed to also withstand multiple laundry cycles and actually provide better barrier properties than the single layer fabric.

More particularly, the seam tape of the present disclosure is capable of sealing the seams and providing the garment with hydrostatic water resistance and/or particulate resistance. The seam tape of the present disclosure replaces the need for producing the garment from a double layer of fabric in order to cover a seam area with an adjacent fabric layer.

The protective garment of the present disclosure has application in all different types of fields and applications. The protective garment, for instance, can be used in industrial settings, school settings, in nursing homes, and the like. When used in the healthcare industry, the protective garment can be made into a drape or gown worn by a patient or a healthcare provider.

When used in the healthcare industry, the protective garment of the present disclosure can be rated according to the Association for the Advancement of Medical Instrumentation (AAMI). The current AAMI standard is described in "Liquid Barrier Performance and Classification of Protective Apparel and Drapes Intended for Use in Health Care Facilities," ANSI/AAMI PB70:2012. This AAMI standard helps to preserve the sterile field and protect health care workers during surgery and other health care procedures during which exposure to blood, body fluids and other potential infectious material might occur. This AAMI standard establishes a system of classification and associated minimum requirements for protective apparel such as gowns and drapes used in health care facilities based on their liquid barrier performance.

The present AAMI standard for liquid barrier performance is provided in the following table:

TABLE 1

AAMI Barrier Protection Levels

| AAMI Level | Test | Result |
| --- | --- | --- |
| 1 | AATCC 42:2017e | ≤4.5 grams |
| 2 | AATCC 42:2017e | ≤1.0 gram |
|   | AATCC 127:2017 | ≥20 cm |
| 3 | AATCC 42:2017e | ≤1.0 gram |
|   | AATCC 127:2017 | ≥50 cm |
| 4 | Gowns: ASTM F1671/F1671 M-13 | Pass |
|   | Drapes: ASTM F1670/F1670 M-17a | Pass |

As shown in the table above, the AAMI uses two tests developed by the American Association of Textile Colorists and Chemists ("AATCC"). AATCC 42 measures a material's water resistance by impact penetration. The material to be tested is held at a 45-degree angle while a fixed amount of water is sprayed on it. A blotter affixed under the material is weighed before and after the water is sprayed to determine how much water penetrated the fabric. According to the present AAMI standard, the material is classified as Level 1 if the weight gain of the blotter is no more than 4.5 grams.

For present AAMI Level 2, the material to be tested must satisfy two AATCC tests—AATCC 42 and AATCC 127. The first test, AATCC 42, is the same as that used for Level 1 except that the increase in the blotter's weight must be no more than 1 gram. The additional test is AATCC 127 which measures a material's resistance to water penetration under hydrostatic pressure. Under this test, a sample of the material to be tested is clamped in place horizontally on the bottom of a glass, metered cylinder. Hydrostatic pressure is increased steadily by increasing the amount of water in the cylinder. To be acceptable for use as a present AAMI Level 2 barrier, the material must be able to resist the penetration of water when it reaches a level of 20 cm.

For present AAMI Level 3, both of the AATCC test methods described above must be satisfied, similar to the requirements to meet the present AAMI Level 2. For AATCC 42, the maximum blotter weight gain is the same as that for Level 2 (i.e., 1 gram). For AATCC 127 to be acceptable for use as a present AAMI Level 3 barrier, the level of water in the cylinder used in AATCC 127 must be at least 50 cm.

For present AAMI Level 4, the AAMI uses two tests developed by the American Society for Testing Materials ("ASTM")-F1670/F1670M-17a for liquid penetration (i.e., surrogate blood) and F1671/F1671M-13 for viral penetration (i.e., bacteriophage Phi-X174). For surgical gowns and other protective apparel, the material must meet the viral challenge of F1671/F1671M-13 which measures the resistance of materials to bloodborne pathogens using viral penetration at 2 psi and ambient pressure. For surgical drapes and accessories, the material must meet the liquid challenge of F1670/F1670M-17a which measures the resistance of drape materials to penetration by synthetic blood at 2 psi and ambient pressure. For both tests, the results are expressed as pass or fail rather than in terms of a material's resistance.

For ASTM F1671/F1671M-13, the material must pass the test for resistance to penetration by bacteriophage Phi-X174. A sample of the material to be tested is placed vertically in a test cell as a membrane between the media challenge (i.e., liquid) and a viewing chamber. Materials that permit penetration during an hour of a prescribed series of changes in air pressure are not considered suitable for use. For ASTM F1670/F1670M-17a, the material must pass the test for resistance to penetration by synthetic blood. As in the test for viral penetration, the material to be tested is mounted in a vertical position on a cell that separates the surrogate blood liquid challenge and the viewing chamber. The test is terminated if visible liquid penetration occurs at any time before or during 60 minutes of changes in pressure and atmospheric protocols.

Protective garments made in accordance with the present disclosure can pass the AAMI Level 1, the AAMI Level 2, and/or the AAMI Level 3 requirements as described above. In particular, the protective garment (including all seams) can display an impact penetration according to Test AATCC 42 of one gram or less and can display a hydrostatic pressure according to Test AATCC 127 of 50 cm or greater.

In addition, the protective garment can also pass European standards, such as test EN13795 and EN14126. For example, the garment can pass the following standards indicated by EN 13795-1 (2019):

| | Characteristics to be evaluated and performance requirements for surgical gowns | | | | | |
|---|---|---|---|---|---|---|
| | Test Method | | Requirement | | | |
| | (for normative | | Standard Performance | | High Performance | |
| Characteristic | references see Clause 2) | Unit | Critical product area | Less critical product area | Critical product area | Less critical product area |
| Microbial penetration -- Dry | EN ISO 22612 | CFU | Not required | ≤300 [a] | Not required | ≤300 [a] |
| Microbial penetration -- Wet | EN ISO 22610 | $I_B$ | ≥2.8 [b] | Not required | 6.0 [b,c] | Not required |
| Cleanliness microbial/ Bioburden | EN ISP 11737-1 | CFU/ 100 cm$^2$ | ≤300 | ≤300 | ≤300 | ≤300 |
| Particle release | EN ISO 9073-10 | $\log_{10}$ (lint count) | ≤4.0 | ≤4.0 | ≤4.0 | ≤4.0 |
| Liquid penetration | EN ISO 811 | cm H$_2$O | ≥20 | ≥10 | ≥100 | ≥10 |
| Bursting strength -- Dry | EN ISO 13938-1 | kPa | ≥40 | ≥40 | ≥40 | ≥40 |
| Bursting strength -- Wet | EN ISO 13938-1 | kPa | ≥40 | Not required | ≥40 | Not required |
| Tensile strength -- Dry | EN 29073-3 | N | ≥20 | ≥20 | ≥20 | ≥20 |
| Tensile strength -- Wet | EN 29073-3 | N | ≥20 | Not required | ≥20 | Not required |

[a] Test conditions: challenge concentration 108 CFU/g talcum and 30 min vibration time. The Least Significant Difference (LSD) for /s when estimated using EN ISO 22610, was found to be 0.98 at the 95% confidence level. This is the minimum difference needed to distinguish between two materials thought to be different. Thus materials varying by up to 0.98 /e are probably not different; materials varying by more than 0.98 le probably are different. (The 95% confidence levels means that an observer would be correct 19 times out of 20 to accept these alternatives.)
[c] /e = 6.0 for the purpose of this document means: no penetration. le = 6.0 is the maximum achievable value.

As described above, protective garments of the present disclosure are designed to be reusable. Consequently, switching from single use products to the protective garment of the present disclosure can significantly increase sustainability, decrease the amount of petroleum-based polymers entering the solid waste stream, and ultimately reduce costs. For example, protective garments made according to the present disclosure can maintain an AAMI Level 3 rating even after 60 laundry cycles, such as greater than 75 laundry cycles, such as greater than 85 laundry cycles, such as greater than 100 laundry cycles, such as even greater than 105 laundry cycles. As used herein, a laundry cycle is according to "Care Code ST." A laundry cycle not only includes laundering of the protective garment but also a sterilization protocol. One laundry cycle in conjunction with a sterilization protocol is as follows:

| Operation | Time | Water Level | Water Temperature | Supplies - 100 lbs |
|---|---|---|---|---|
| 1. Flush | 3 min | High | Cold | |
| 2. Flush | 3 min | High | Cold | |
| 3. Break | 10 min | Low | 160° F. | (8 oz. nonionic detergent - 8 oz. alkali Max pH-10.0) |
| 4. Rinse | 3 min | High | 140° F. | |
| 5. Extract | 3 min | | | |
| 6. Rinse | 2 min | High | 120° F. | |
| 7. Rinse | 2 min | High | 100° F. | |
| 8. Rinse | 2 min | High | Cold | |
| 9. Sour | 5 min | Low | Cold | Sour to pH 6.0 (citric acid) |
| 10. Extract | 3-5 min | | | |

Vacuum Steam Sterilization Protocol:
Temperature: 134° C./274° F.
Exposure Time: 4 minutes
Exhaust Time: 20 minutes The protective garment of the present disclosure maintains its protective qualities and characteristics due to the use of a seam tape that not only has excellent barrier properties but also is very durable. The seam tape of the present disclosure generally includes a specially adapted adhesive layer in conjunction with a covering layer, which can be a fabric layer. In one aspect, the seam tape can include a third layer positioned in between the covering layer and the adhesive layer. The third layer, for instance, can be a microporous film.

Figure 4:
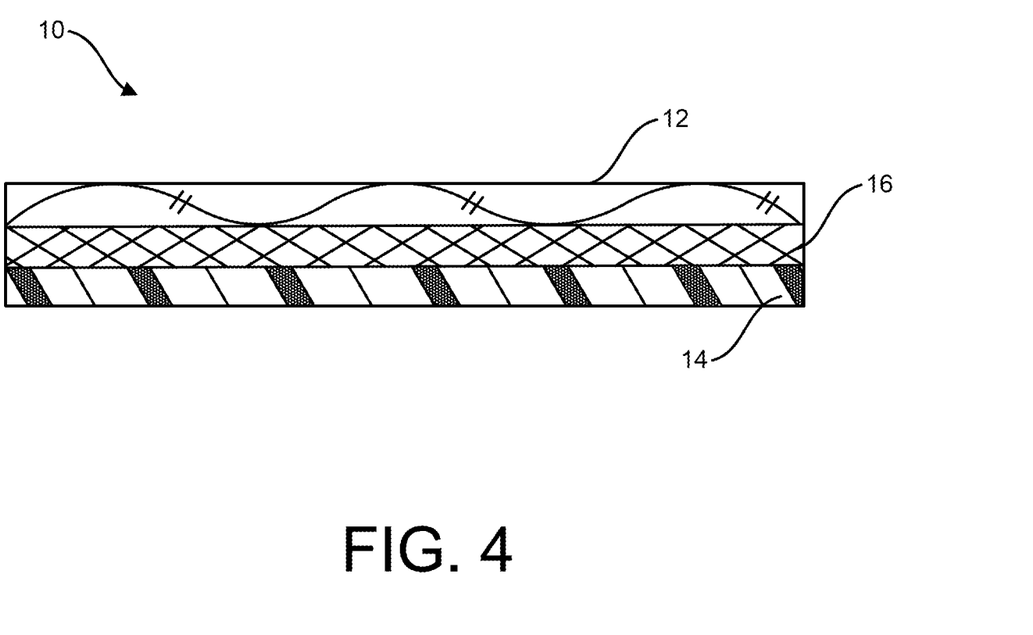
FIG. 4 is a cross-sectional view of one embodiment of a seam tape made in accordance with the present disclosure.

Referring to FIG. 4, one embodiment of a three-layer seam tape made in accordance with the present disclosure is shown. In this embodiment, the seam tape 10 includes a cover layer 12, an adhesive layer 14, and an optional film layer 16 positioned between the cover layer 12 and the adhesive layer 14.

In accordance with the present disclosure, the adhesive layer 14 is made from a thermoset polymer particularly well suited to producing a durable bond with the primary fabric layer that forms the protective garment. In one aspect, the adhesive layer 14 has a particular thickness well suited to forming a durable bond with the fabric that is adjacent to the seam of the protective garment.

In one aspect, for instance, the adhesive layer 14 includes a polyester thermoset adhesive film. In this regard, the adhesive layer 14 can be continuous. Although a continuous film is preferred, in alternative embodiments, the adhesive layer 14 may be discontinuous. When discontinuous, the film can cover greater than about 50% of the surface area of the adjacent layer, which is the film layer 16 in FIG. 4, such as greater than about 60% of the surface area, such as greater than about 70% of the surface area, such as greater than about 80% of the surface area.

In one particular embodiment, the adhesive layer 14 is made from an adhesive containing a linear saturated copolyester resin. The copolyester resin can be crosslinkable. In this manner, when the seam tape 10 is applied to a seam and heated under pressure, the elevated temperature causes the polymer in the adhesive layer 14 to crosslink and form a thermoset polymer. The thermoset polymer produces adhesive bonds with the opposing fabric and/or mechanical bonds.

The curing temperature of the adhesive layer 14 can vary depending upon the particular application or desired result. For instance, the curing temperature can be greater than about 300° F., such as greater than about 350° F., such as greater than about 375° F., such as greater than about 400° F., and generally less than about 550° F.

The copolyester polymer contained in the adhesive layer 14 can vary depending upon various factors. In one aspect, the polyester polymer is a copolyester, such as a copolyester block copolymer. In one aspect, the copolyester can contain a low polarity block in the copolyester backbone as described in U.S. Pat. No. 6,774,183, which is incorporated herein by reference.

Alternatively, the polyester resin can be a cycloaliphatic copolyester. The polyester, for instance, can include polybutylene adipate. Cycloaliphatic polyester resins that may be incorporated into the adhesive layer, for instance, are described in U.S. Pat. No. 5,977,283, which is incorporated herein by reference.

In one aspect, a copolyester can be selected having a relatively high glass transition temperature. For instance, the glass transition temperature of the copolyester can be greater than about 58° C., such as greater than about 62° C., such as greater than about 65° C., such as greater than about 70° C., such as greater than about 75° C., such as greater than about 80° C., and generally less than about 90° C., such as less than about 85° C. Copolyesters having high glass transition temperatures, for instance, are disclosed in U.S. Patent Publication No. 2011/0268909, which is incorporated herein by reference.

In one aspect, the adhesive layer 14 can contain a copolyester polymer in combination with a crosslinking agent. The crosslinking agent, for instance, can be any suitable curable component. For example, the crosslinking agent can include aminoplasts, phenoplasts, epoxy resins, polyisocyanates, silanes, aziridines, or mixtures thereof.

In one aspect, the crosslinking agent can be an isocyanate.

In one aspect, the adhesive layer 14 is relatively thick in order to improve durability. The thickness of the adhesive layer can also promote intermingling between the adhesive and the fabric to which the adhesive bonds. For example, in one aspect, the adhesive layer 14 can have a thickness of greater than about 2.5 mils. For instance, the thickness of the adhesive layer can be from about 2.5 mils to about 6 mils, including all increments of 0.1 mils therebetween. In various embodiments, the adhesive layer 14 can be greater than about 3 mils, such as greater than about 3.2 mils, such as greater than about 3.4 mils, such as greater than about 3.6 mils, and generally less than about 5 mils, such as less than about 4.5 mils, such as less than about 4.1 mils. During installment of the seam tape along the seam of a protective garment, the seam tape is subjected to relatively high temperatures and pressures. By having a relatively thicker adhesive layer, the adhesive layer is capable of impregnating the opposing fabric and filling the interstices of the fabric between and around the yarns. In this manner, a strong and durable bond is formed between the seam tape and the fabric.

As shown in FIG. 4, the seam tape 10 can also include a cover layer or fabric layer 12. The cover or fabric layer 12 can comprise any suitable material. For instance, the cover layer 12 can comprise a film layer, a nonwoven layer, a woven layer, or a knitted layer. In one aspect, the cover layer 12 is a fabric layer. For instance, the cover layer 12 can be made from the same fabric that is used to make the remainder of the protective garment. The fabric material used to produce the protective garment is discussed in greater detail below.

In one aspect, the cover layer 12 can be made from polyester yarns. The woven fabric can have, for instance, warp yarns having a yarn density of greater than about 80 yarns per inch, such as greater than about 100 yarns per inch, such as greater than about 120 yarns per inch, such as greater than about 130 yarns per inch, such as greater than about 140 yarns per inch, and generally less than about 220 yarns per inch, such as less than about 200 yarns per inch, such as less than about 190 yarns per inch, such as less than about 180 yarns per inch, such as less than about 160 yarns per inch. In the fill direction, the yarn density can be greater than about 70 yarns per inch, such as greater than about 75 yarns per inch, such as greater than about 80 yarns per inch, such as greater than about 85 yarns per inch, such as greater than about 90 yarns per inch, such as greater than about 95 yarns per inch, and generally less than about 135 yarns per inch, such as less than about 110 yarns per inch. The yarn can have a denier of from 70 to 75 and can contain from about 30 to about 50 filaments per yarn.

In one aspect, the cover layer 12 has a relatively light basis weight. For instance, the cover layer 12 can have a basis weight of less than about 5 osy, such as less than about 4 osy, such as less than about 3 osy, such as less than about 2.5 osy, and generally greater than about 0.5 osy, such as greater than about 1 osy, such as greater than about 1.5 osy, such as greater than about 2 osy.

As shown in FIG. 4, the seam tape 10 can further optionally include a microporous film or membrane. The membrane, for instance, can be made from polyesters, polyamides, polyketones, polysulphones, polycarbonates, fluoropolymers, polyacrylates, co-polyether esters, co-polyether amides, polyurethanes, polyvinylchloride, polytetrafluoroethylene or polyolefins. For waterproof breathable applications the film layer is preferably, formed from expanded polytetrafluoroethylene (ePTFE). Expanded polytetrafluoroethylene is known to be very waterproof and highly breathable. The ePTFE may be provided with a coating of a hydrophilic polymer in known manner. Such laminates may preferably provide a water-vapor transmission rate of greater than 1500 g/m$^2$/day (particularly greater than 3000 g/m$^2$/day) and a water entry pressure of greater than 0.07 bar for a period of at least three minutes.

Examples of expanded polytetrafluoroethylene films are described, for instance, in U.S. Pat. Nos. 3,953,566 and 4,187,390 which are incorporated herein by reference.

The film layer or the expanded polytetrafluoroethylene layer can generally have a thickness of greater than about 20 microns, such as greater than about 30 microns, and generally less than about 80 microns, such as less than about 65 microns, such as less than about 45 microns. The basis weight of the film layer 16 can be, for instance, from about 5 gsm to about 25 gsm, such as from about 10 gsm to about 20 gsm.

The seam tape 10 as shown in FIG. 4 can have a length sufficient to extend over a seam of the protective garment in a continuous manner. The width of the seam tape can vary depending upon the particular application and the type of fabric to which the seam tape is bonded. In one aspect, the seam tape is from about 0.75 inches to about 2.5 inches wide, including all increments of 0.1 inches therebetween. The seam tape, for instance, can be greater than about 0.8 inches, such as greater than about 0.9 inches, and generally less than about 2 inches, such as less than about 1.75 inches, such as less than about 1.5 inches, such as less than about 1.4 inches.

In one embodiment, the seam tape 10 as shown in FIG. 4, can optionally include a release layer. Not shown in FIG. 4, the release layer can cover the adhesive layer prior to application to a seam on a protective garment. The release layer can comprise any suitable release material. For instance, in one embodiment, the release layer can be a silicone or silicone-coated substrate or film. In general, any suitable silicone release layer can be used.

The seam tape 10 as shown in FIG. 4 can be incorporated into any suitable protective garment or apparel. The seam tape 10 can be applied to the fabric before or after garment construction.

Figure 1:
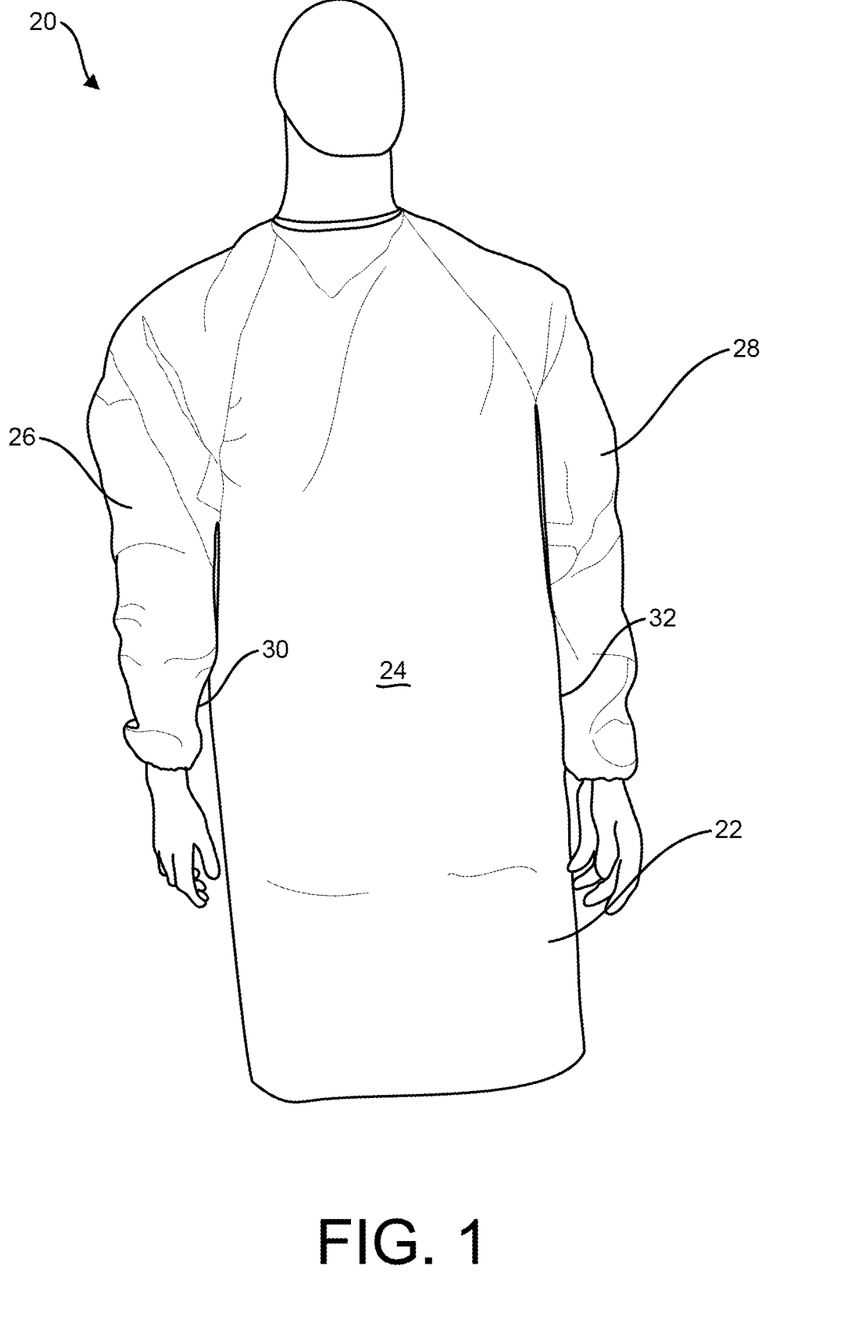
FIG. 1 is a perspective view of one embodiment of a front of a protective garment made in accordance with the present disclosure.
Figure 2:
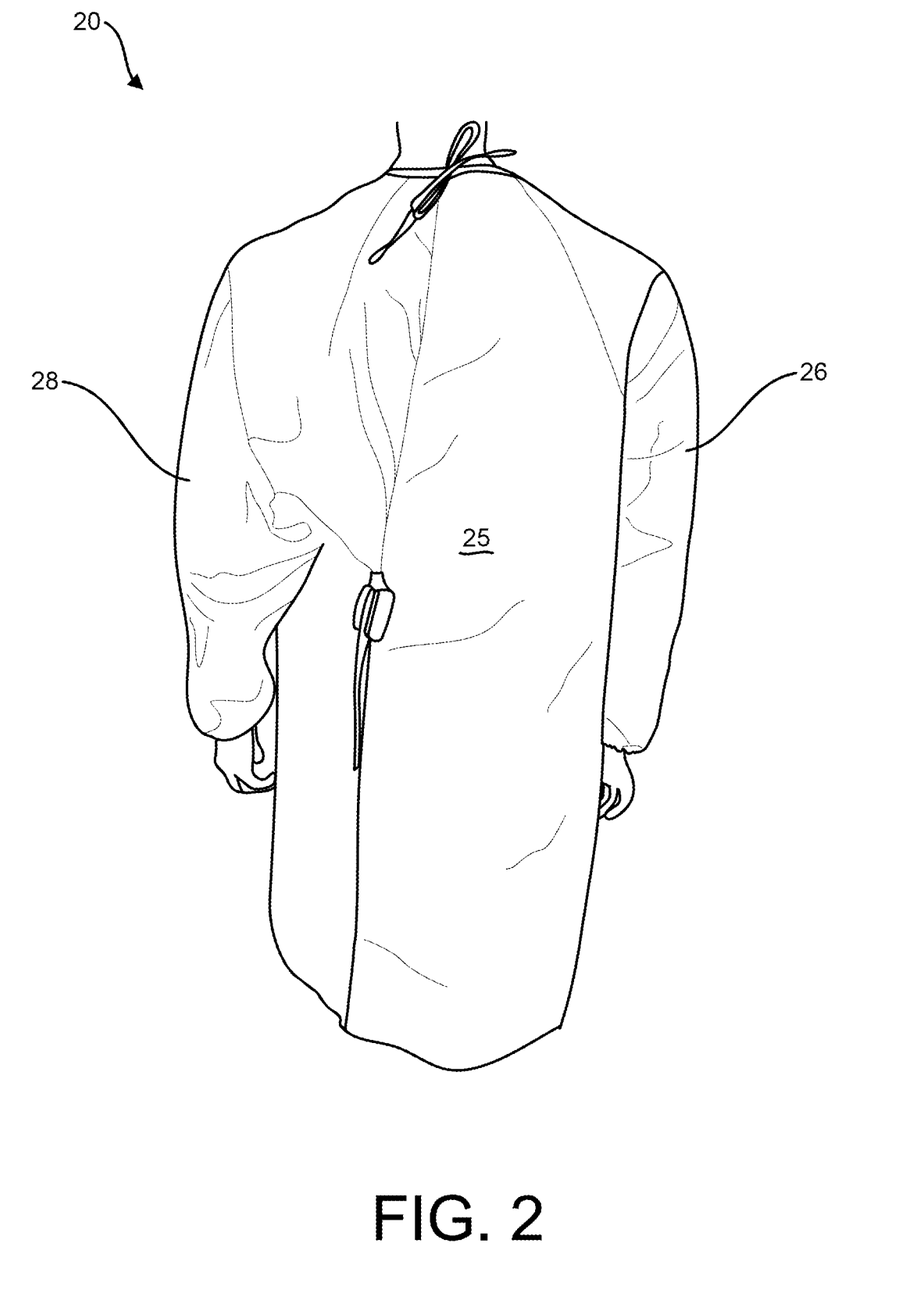
FIG. 2 is a perspective view of one embodiment of a back of a protective garment made in accordance with the present disclosure.

Referring to FIGS. 1 and 2, for instance, one embodiment of a protective garment 20 is shown. Protective garment 20 can include a body portion 22 that can include a front 24 and a back 25. The body portion 22 can be connected to a first sleeve 26 and a second sleeve 28. The protective garment 20 can be made from a single piece of fabric. In order to form the first sleeve 26 or the second sleeve 28, however, the fabric can be connected together along a first seam 30 and a second seam 32. Each seam can be formed by stitching the opposing material together. In one embodiment, the seam can be formed by two parallel rows of stitching. The seam can be made according to U.S. Pat. No. 6,680,100, which is incorporated herein by reference.

Figure 3:
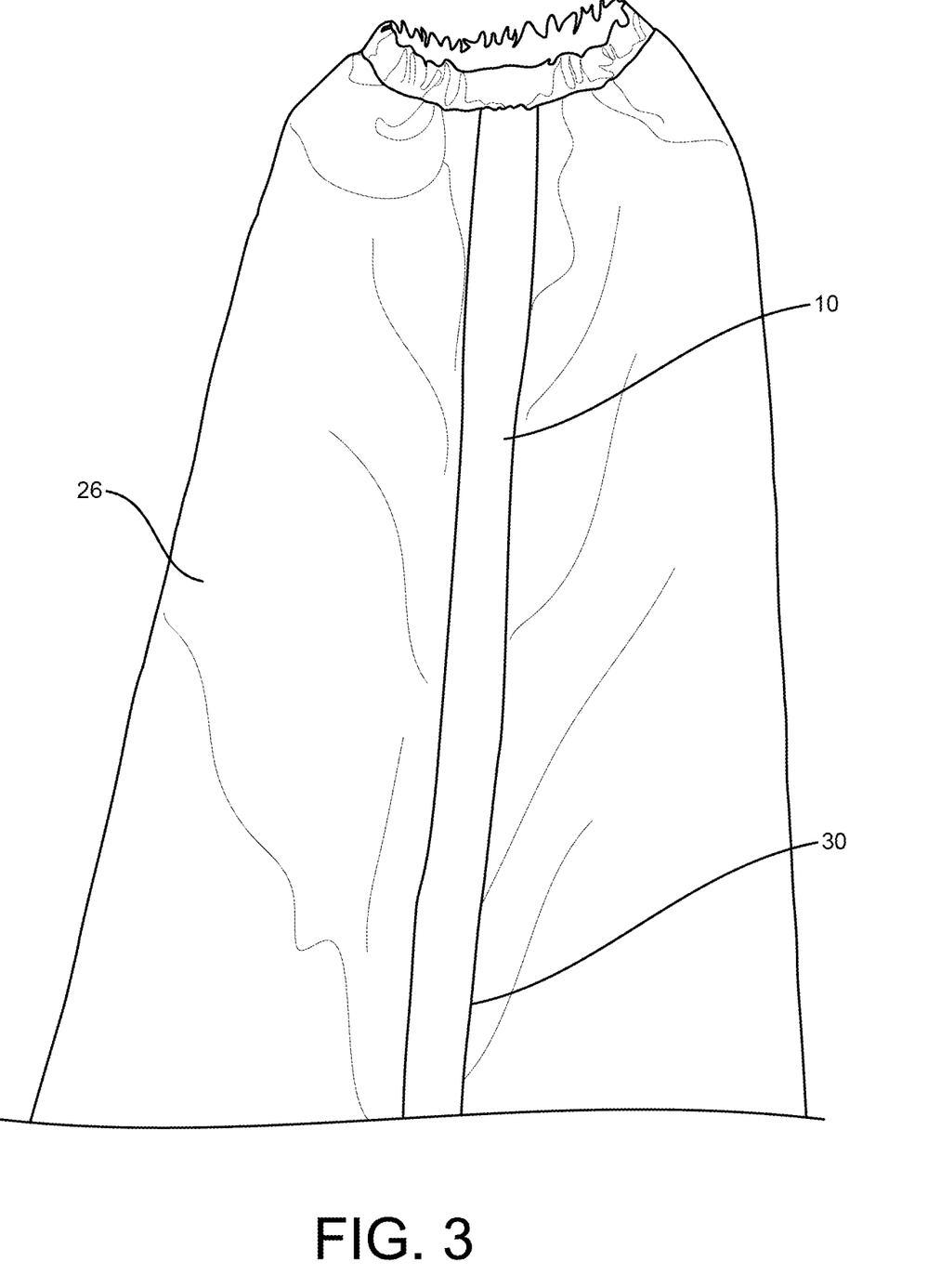
FIG. 3 is a plan view of one embodiment of a seam tape applied to the protective garment illustrated in FIG. 1 in accordance with the present disclosure.

The seam tape 10 as shown in FIG. 4 can be placed over each seam 30 and 32 for improving the barrier properties of the protective garment 20 along the seams 30 and 32 as shown in FIG. 3.

The fabric that is used to construct the garment illustrated in FIG. 1 can be any suitable barrier fabric. For example, the fabric can be a woven fabric or a knitted fabric. In one aspect, the garment 20 can be made from a single layer of fabric material and still have the desired barrier properties due to the use of the seam tape of the present disclosure.

In one aspect, the protective garment 20 is formed from a polyester woven fabric. For instance, the fabric can contain greater than 80%, such as greater than 90%, such as 100% by weight polyester fibers. The fabric can be formed from polyester yarns. In one aspect, the polyester yarns are formed from continuous filaments, such as polyester multi-filament yarns. The yarns in both the warp direction and the fill direction can generally have a relatively low denier. For instance, the yarns can have a denier of less than about 300, such as less than about 200, such as less than about 150, such as even less than about 100. The denier of the yarns is greater than about 10, such as greater than about 50. Each yarn can contain at least about 10 filaments, such as at least about 20 filaments, such as at least about 30 filaments, such as at least about 40 filaments, and generally less than about 100 filaments, such as less than about 70 filaments, such as less than about 60 filaments. In one aspect, the yarn has a denier of from 70 to 75 and contains 30 to 50 filaments per yarn.

In addition to polyester yarns, in one embodiment the fabric can contain anti-static fibers and yarns. For example, anti-static yarns can comprise bicomponent filaments that include a polymer core surrounded by a carbon sheath.

Each yarn can include a single end or can include two ends.

Optionally, the yarns can be textured. In such yarns, the filaments are distorted from their generally rectilinear condition to increase the bulk of the yarn and also to provide an ability for a fabric woven therefrom to stretch. A textured yarn may be "set" by heat relaxation to minimize its stretch characteristic, while maintaining its increased bulk, i.e., higher bulked denier.

There are several types of textured yarns capable of being produced by various methods. Different types of textured yarns have different characteristics, some being more expensive than others. The textured yarns that may be employed in the present fabric constructions, or referenced herein, are:

(1) False twist yarn is twisted in one direction, set, then twisted in the opposite direction and set. The twisting, setting, opposite twisting are repeated throughout the length of the yarn.

(2) Core and effect yarn (also known as "core bulked" yarns) is a multiple ended yarn, usually comprising two ends in which one end is essentially straight. The filaments of other end are distorted around the core end and sometimes through the core end.

(3) Air texturized core and effect yarn—is a core and effect yarn in which distortion of the filaments is done by air jet means. An air texturized core and effect yarn has unique properties which distinguish it from other textured yarns. These unique properties have been found effective in attaining the ends herein sought.

In addition to using relatively low denier yarns, the barrier fabric of the present disclosure can also have a relatively high yarn density. For instance, in the warp direction, the fabric can have greater than about 80 yarns per inch, such as greater than about 100 yarns per inch, such as greater than about 110 yarns per inch, such as greater than about 120 yarns per inch, such as greater than about 130 yarns per inch, such as greater than about 140 yarns per inch, such as greater than about 150 yarns per inch, and generally less than about 200 yarns per inch, such as less than about 180 yarns per inch. In the fill direction, the yarn density can be greater than about 60 yarns per inch, such as greater than about 65 yarns per inch, such as greater than about 70 yarns per inch, such as greater than about 75 yarns per inch, such as greater than about 80 yarns per inch, such as greater than about 85 yarns per inch, and generally less than about 130 yarns per inch, such as less than about 120 yarns per inch, such as less than about 100 yarns per inch.

Various different fabric constructions can be used in order to produce the barrier fabric of the present disclosure. For example, in one embodiment, the fabric has a basis weight of from about 2 osy to about 3.25 osy, has a warp yarn density of from about 150 warp yarns per inch to about 165 warp yarns per inch and contains fill yarns in an amount from about 80 yarns per inch to about 110 yarns per inch. The yarns can be 1/75/36 false twist textured yarns. The false twist textured yarns can be continuous filament yarns that have been processed to introduce crimps, coils, loops and other fine distortions along the yarn's length. Such yarns can improve various properties of the fabric including stretch, bulk, and thermal insulation while providing an appearance similar to natural fibers. In one embodiment, the fabric can also include yarns containing carbon.

Alternatively, the barrier fabric can have a basis weight of from about 2.25 osy to about 3.1 osy, can contain from about 150 to about 165 warp yarns per inch, can contain from about 95 to about 110 fill yarns per inch, and can be made from stretch draw textured yarn. The warp yarns can also contain carbon yarns, carbon filaments, or carbon fibers.

In still another embodiment, the barrier fabric can have a basis weight of from about 2.5 osy to about 3.5 osy and can be made from flat yarn that is not textured. The flat yarn, for instance, can be fully oriented yarn. The filaments in a flat yarn generally lie straight and are parallel to the yarn axis. Thus, flat yarns can be closely packed and have a smooth surface. The fabric can have from about 170 to about 185 warp yarns per inch and from about 95 to about 115 fill yarns per inch.

In still another embodiment, the barrier fabric can be made from fully drawn yarns. In one example, for instance, the barrier fabric can have a basis weight of from about 2.75 osy to about 3.5 osy, can contain from about 165 to about 185 warp yarns per inch, and from about 100 to about 120 fill yarns per inch.

The barrier fabric of the present disclosure can also be calendered. Calendering can increase the barrier properties and reduce the permeability of the fabric. During calendering, the fabric is passed between a pair of pressure rolls wherein at least one of the rolls is heated. When a woven polyester fabric is calendered, the fabric is compressed and its density is increased as the interstices between the yarns and the filaments of the yarns are decreased.

The barrier fabric used to produce the protective garment 20 can also include a durable water-resistant treatment. The durable water-resistant treatment prevents liquids from being absorbed by the fabric. The durable water-resistant treatment can also make the fabric resistant to oil, various solvents, and can make the fabric more abrasion-resistant. In one aspect, the durable water-resistant treatment is made from a solution containing a fluorocarbon polymer, such as a polytetrafluoroethylene polymer. Prior to applying the durable water-resistant treatment, the fabric can optionally be scoured, dried and heat set. Although the durable water-resistant treatment can be sprayed or printed onto the fabric, in one embodiment, the fabric is dipped into a bath containing the durable water-resistant treatment. The durable water-resistant treatment can impregnate the fabric.

In one aspect, the durable water-resistant treatment contains a fluorocarbon polymer in combination with a wetting agent, an extender and optionally a binder. After the durable water-resistant treatment is applied to the fabric, the fabric can be heated to a temperature sufficient for the durable water-resistant treatment to dry and cure.

Although durable water-resistant treatments greatly improve the barrier properties of the fabric, these treatments can be problematic for attaching seam tapes to the seams of the garment. The adhesive layer of the present disclosure, however, has been found to securely affix to a fabric, even if the fabric has been treated with a durable water-resistant treatment, such as a fluorocarbon chemical.

Barrier fabrics as described above can have an excellent balance of properties. For instance, the barrier fabric, when tested according to AATCC 127 can display a hydrostatic head of greater than about 45 cm, such as greater than about 60 cm, such as greater than about 70 cm, such as greater than about 75 cm, and generally less than about 120 cm. The fabric can have an air porosity when tested according to ASTM Test D737 of from about 0.75 ft$^3$/min/ft$^2$ to about 2.75 ft$^3$/min/ft$^2$. When tested according to AATCC 42, the barrier fabric can display an impact penetration of less than about 0.2 grams, such as less than about 0.1 grams. When tested according to AATCC 22, the fabric can have a spray rating of 100, even after 100 laundry cycles.

The barrier fabric can have a tensile strength (ASTM Test D5034) in the warp direction of greater than about 190 lbf, such as greater than about 200 lbf, such as greater than about 210 lbf, and generally less than about 265 lbf and can have a tensile strength in the fill direction of greater than about 80 lbf, such as greater than about 90 lbf, such as greater than about 95 lbf, and generally less than about 185 lbf. The barrier fabric can have a tear strength (ASTM Test D5587) in the warp direction of greater than about 20 lbf, such as greater than about 22 lbf, such as greater than about 24 lbf, and generally less than about 35 lbf. The tear strength in the fill direction can generally be greater than about 5 lbf, such as greater than about 6 lbf, such as greater than about 7 lbf, and generally less than about 13 lbf. The barrier fabric can have a bursting strength (ASTM Test D3786) of greater than about 200 lbs, such as greater than about 220 lbs, such as greater than about 240 lbs, and generally less than about 280 lbs, such as less than about 260 lbs. The barrier fabric can have a seam strength (ASTM Test D1683) in the warp direction of greater than about 60 lbf, such as greater than about 70 lbf, such as greater than about 75 lbf, and generally less than about 125 lbf. The seam strength in the fill direction can be greater than about 50 lbf, such as greater than about 60 lbf, such as greater than about 63 lbf, and generally less than about 90 lbf.

In order to apply the seam tape of the present disclosure to a seam on a garment like the one illustrated in FIG. 1, the seam tape is placed along the seam and heat and pressure are applied in an amount sufficient for the adhesive layer to be pressed into the fabric and cured. In one embodiment, for instance, the seam tape can be applied to a seam using a hot head press set to a temperature of greater than about 370° F., such as greater than about 380° F., such as greater than about 390° F., such as greater than about 395° F., and generally less than about 500° F., such as less than about 475° F., such as less than about 440° F. The hot head press can be set to a pressure of from about 30 psi to about 80 psi, such as at a pressure of from about 50 psi to about 60 psi. Heat and pressure are applied to the seam tape for a time of from about 5 seconds to about 3 minutes, such as for a time of from about 15 seconds to about 45 seconds. When the seam tape is being applied to a seam, a release paper can be placed on the opposite side of the seam to prevent adhesive flow through.

Alternatively, the seam tape can be applied to the fabric or garment using a hot air machine followed by feeding the laminate through pressure rollers. The hot air machine can operate at air temperatures above 330° F., such as greater than 350° F. and generally less than about 450° F.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. A protective garment comprising:
    a body portion having at least a front section, the body portion being connected to a first sleeve and to a second and opposite sleeve, each sleeve defining a hollow tubular portion for receiving a corresponding arm of a user, the body portion being made from a woven fabric, the woven fabric having a basis weight of from about 0.5 osy to about 4 osy, the woven fabric having a yarn density in a warp direction of from about 100 yarns per inch to about 230 yarns per inch and in a fill direction of from about 60 yarns per inch to about 120 yarns per inch, the first sleeve defining a first seam that extends along the length of the hollow tubular portion of the first sleeve and the second sleeve defining a second seam that extends along the length of the hollow tubular portion of the second sleeve;
    a first seam tape covering the first seam and a second seam tape covering the second seam, each seam tape comprising a fabric layer, an adhesive layer, and optionally a film layer positioned between the fabric layer and the adhesive layer, the adhesive layer being bonded to the woven fabric along the respective seam, the adhesive layer comprising a thermoset polymer, the adhesive layer having a thickness of greater than about 3.1 mils and less than about 4.5 mils; and
    wherein the protective garment when tested according to AAMI protocols qualifies for Level 3 protection.

2. A protective garment as defined in claim 1, wherein the protective garment maintains Level 3 protection according to AAMI after 60 laundry cycles.

3. A protective garment as defined in claim 1, wherein the thermoset polymer contained in the adhesive layer comprises a thermoset copolyester polymer.

4. A protective garment as defined in claim 3, wherein the copolyester polymer is crosslinked.

5. A protective garment as defined in claim 1, wherein the adhesive layer of the seam tape has been pressed into the interstices of the woven fabric along the respective seam.

6. A protective garment as defined in claim 1, wherein the adhesive layer has a thickness of at least 2.5 mils.

7. A protective garment as defined in claim 1, wherein the film layer of each seam tape comprises an expanded polytetrafluoroethylene film.

8. A protective garment as defined in claim 1, wherein the fabric layer of each seam tape comprises a woven and calendered polyester fabric.

9. A protective garment as defined in claim 1, wherein the body portion, the first sleeve and the second sleeve are each made from a single layer of the woven fabric except for where the first seam tape and the second seam tape are located.

10. A protective garment as defined in claim 1, wherein the woven fabric that comprises the body portion, the first sleeve, and the second sleeve has been treated with a durable water-resistant treatment.

11. A seam tape as defined in claim 1, wherein the seam tape has a width of from about 0.75 inches to about 2.5 inches.

12. A seam tape as defined in claim 1, wherein the adhesive layer comprises a crosslinkable copolyester polymer, the crosslinkable copolyester polymer having a glass transition temperature of greater than about 58° C. and less than about 90° C.

13. A seam tape as defined in claim 1, further comprising a release layer covering the adhesive layer.

14. A seam tape as defined in claim 1, wherein the adhesive layer has a cure temperature of greater than about 350° F., and less than about 480° F.

15. A seam tape as defined in claim 1, wherein the film layer of each seam tape comprises an expanded polytetrafluoroethylene film.

16. A seam tape as defined in claim 1, wherein the fabric layer comprises a woven polyester fabric.

17. A seam tape as defined in claim 16, wherein the woven polyester fabric has a basis weight of from about 0.5 osy to about 4 osy, the fabric having a yarn density in a warp direction of from about 100 yarns per inch to about 230 yarns per inch and having a yarn density in a fill direction of from about 60 yarns per inch to about 120 yarns per inch.

18. A seam tape as defined in claim 1, wherein the adhesive layer has a cure temperature of greater than 400° F. and less than about 480° F.

19. A seam tape as defined in claim 1, wherein the film layer has a thickness of greater than about 20 microns and less than about 80 microns.

20. A protective garment as defined in claim 1, wherein the woven fabric comprises polyester yarns in an amount greater than about 80% by weight.

* * * * *